United States Patent
Hunt

(10) Patent No.: US 12,313,769 B2
(45) Date of Patent: May 27, 2025

(54) SYSTEMS AND METHODS FOR CALIBRATING A RADAR SYSTEM

(71) Applicants: DENSO International America, Inc., Southfield, MI (US); DENSO CORPORATION, Kariya (JP)

(72) Inventor: Shawn Hunt, Bethal Park, PA (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 452 days.

(21) Appl. No.: 17/961,706

(22) Filed: Oct. 7, 2022

(65) Prior Publication Data

US 2024/0118386 A1 Apr. 11, 2024

(51) Int. Cl.
*G01S 7/40* (2006.01)
*G01S 13/89* (2006.01)

(52) U.S. Cl.
CPC ............... *G01S 7/40* (2013.01); *G01S 13/89* (2013.01)

(58) Field of Classification Search
CPC ........ G01S 13/89; G01S 7/2883; G01S 13/58; G01S 7/417; G01S 7/403; G01S 13/931; G01S 7/4817; G01S 7/497; G01S 7/4091; G01S 7/356; G01S 7/4972; G01S 7/52004
See application file for complete search history.

(56) References Cited

U.S. PATENT DOCUMENTS

| | | | |
|---|---|---|---|
| 9,952,313 B2 | 4/2018 | Cho | |
| 2015/0070207 A1 | 3/2015 | Millar et al. | |
| 2022/0196798 A1* | 6/2022 | Chen | G01S 7/354 |
| 2022/0335279 A1* | 10/2022 | Tyagi | G06N 20/00 |

OTHER PUBLICATIONS

B. Major et al., "Vehicle Detection With Automotive Radar Using Deep Learning on Range-Azimuth-Doppler Tensors," 2019 IEEE/CVF International Conference on Computer Vision Workshop (ICCVW), Seoul, Korea (South), 2019, pp. 924-932, doi: 10.1109/ICCVW.2019.00121. (Year: 2019).*
Zhang, et al., RADDet: Range-Azimuth-Doppler Based Radar Object Detection for Dynamic Road Users, from University of Ottawa and Sensorcortek Inc., May 2, 2021, 8 pages.

* cited by examiner

*Primary Examiner* — Olumide Ajibade Akonai
(74) *Attorney, Agent, or Firm* — Harness, Dickey & Pierce, P.L.C.

(57) ABSTRACT

A method for calibrating a radar system comprising one or more radar sensors includes defining, for a given calibration iteration from among a plurality of calibration iterations, one or more operational characteristics of the one or more radar sensors and generating a range-azimuth map based on radar data generated by the one or more radar sensors. The method includes identifying a reference set of pixels from among the plurality of pixels, where the reference set of pixels is associated with a reference object, determining whether a set of intensity values associated with the reference set of pixels satisfies an intensity condition, and adjusting the one or more operational characteristics of the one or more radar sensors in response to the set of intensity values not satisfying the intensity condition.

20 Claims, 5 Drawing Sheets

SYSTEMS AND METHODS FOR CALIBRATING A RADAR SYSTEM

FIELD

The present disclosure relates to systems and methods for calibrating a radar system.

BACKGROUND

The statements in this section merely provide background information related to the present disclosure and may not constitute prior art.

Autonomous and semi-autonomous vehicles use radar and lidar sensors to detect objects in an environment surrounding the vehicle and to perform localization routines, such as a driver assistance routine, an adaptive cruise control routine, a braking routine, and/or an object detection routine. While lidar sensors have higher resolution compared to radar sensors, adverse weather conditions inhibit the accuracy of the localization routines when using lidar sensors. Specifically, lidar beams may refract off droplets formed by, for example, fog, rain, and/or snow. Furthermore, when radar sensors are provided by, for example, frequency-modulated continuous wave radars, identifying and employing the operational characteristics that enhance the operation range and accuracy of the above-identified localization routines may be a resource intensive and time-consuming task.

SUMMARY

This section provides a general summary of the disclosure and is not a comprehensive disclosure of its full scope or all of its features.

The present disclosure provides a method for calibrating a radar system comprising one or more radar sensors. The method includes defining, for a given calibration iteration from among a plurality of calibration iterations, one or more operational characteristics of the one or more radar sensors and generating a range-azimuth map based on radar data generated by the one or more radar sensors, where: the radar data is based on the one or more operational characteristics, the range-azimuth map comprises a plurality of pixels and a plurality of intensity values, and each pixel from among the plurality of pixels is associated with one intensity value from among the plurality of intensity values. The method includes identifying a reference set of pixels from among the plurality of pixels, where the reference set of pixels is associated with a reference object, determining whether a set of intensity values associated with the reference set of pixels satisfies an intensity condition, and adjusting the one or more operational characteristics of the one or more radar sensors in response to the set of intensity values not satisfying the intensity condition.

The following includes variations of the method for calibrating a radar system of the above paragraph, which may be implemented individually or in any combination.

In one form, the one or more radar sensors include a frequency-modulated continuous wave (FMCW) radar. In one form, the one or more operational characteristics include a transmission frequency, a frequency slope, a sampling rate, a modulation pattern, a sampling period, a sampling start time, or a combination thereof. In one form, the reference object and the one or more radar sensors are separated by a predetermined distance. In one form, generating the range-azimuth map further comprises converting the radar data into one or more estimated distances and one or more estimated angular displacements based on a Fast Fourier Transform (FFT) routine.

In one form, the method includes summing each intensity value from among the set of intensity values to generate an aggregate intensity value, determining whether the aggregate intensity value is greater than one or more additional aggregate intensity values associated with one or more additional calibration iterations from among the plurality of calibration iterations, and determining the set of intensity values associated with the reference set of pixels satisfies the intensity condition in response to the aggregate intensity value being greater than the one or more additional aggregate intensity values. In one form, determining the set of intensity values associated with the reference set of pixels does not satisfy the intensity condition in response to the aggregate intensity value being less than the one or more additional aggregate intensity values.

In one form, identifying the reference set of pixels from among the plurality of pixels further comprises performing a random forest classifier routine to identify the reference set of pixels. In one form, identifying the reference set of pixels from among the plurality of pixels further comprises performing a convolutional neural network routine to identify the reference set of pixels.

The present disclosure provides a system for calibrating a radar system comprising one or more radar sensors and using a reference object. The system includes one or more processors and one or more nontransitory computer-readable mediums storing instructions that are executable by the one or more processors. The instructions comprise defining, for a given calibration iteration from among a plurality of calibration iterations, one or more operational characteristics of the one or more radar sensors, and generating a range-azimuth map associated based on radar data generated by the one or more radar sensors, where the range-azimuth map comprises a plurality of pixels and a plurality of intensity values, and where each pixel from among the plurality of pixels is associated with one intensity value from among the plurality of intensity values. The instructions comprise identifying, using one of a random forest classifier and a convolutional neural network, a reference set of pixels from among the plurality of pixels, where the reference set of pixels is associated with the reference object, determining whether a set of intensity values associated with the reference set of pixels satisfies an intensity condition, and adjusting the one or more operational characteristics of the one or more radar sensors in response to the set of intensity values not satisfying the intensity condition.

The following includes variations of the system for calibrating a radar system of the above paragraph, which may be implemented individually or in any combination.

In one form, the instructions include summing each intensity value from among the set of intensity values to generate an aggregate intensity value, determining whether the aggregate intensity value is greater than one or more additional aggregate intensity values associated with one or more additional calibration iterations from among the plurality of calibration iterations, and determining the set of intensity values associated with the reference set of pixels satisfies the intensity condition in response to the aggregate intensity value being greater than the one or more additional aggregate intensity values. In one form, the instructions include determining the set of intensity values associated with the reference set of pixels does not satisfy the intensity condition in response to the aggregate intensity value being less than the one or more additional aggregate intensity values.

The present disclosure provides a method for calibrating a radar system comprising one or more radar sensors and using a reference object. The method includes defining, for a given calibration iteration from among a plurality of calibration iterations, one or more operational characteristics of the one or more radar sensors, where: the one or more radar sensors include a frequency-modulated continuous wave (FMCW) radar. The method includes generating a range-azimuth map associated based on radar data generated by the one or more radar sensors, where the range-azimuth map comprises a plurality of pixels and a plurality of intensity values, and where each pixel from among the plurality of pixels is associated with one intensity value from among the plurality of intensity values, and identifying, using one of a random forest classifier and a convolutional neural network, a reference set of pixels from among the plurality of pixels, where the reference set of pixels is associated with the reference object. The method includes determining whether a set of intensity values associated with the reference set of pixels satisfies an intensity condition, and adjusting the one or more operational characteristics of the one or more radar sensors in response to the set of intensity values not satisfying the intensity condition.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
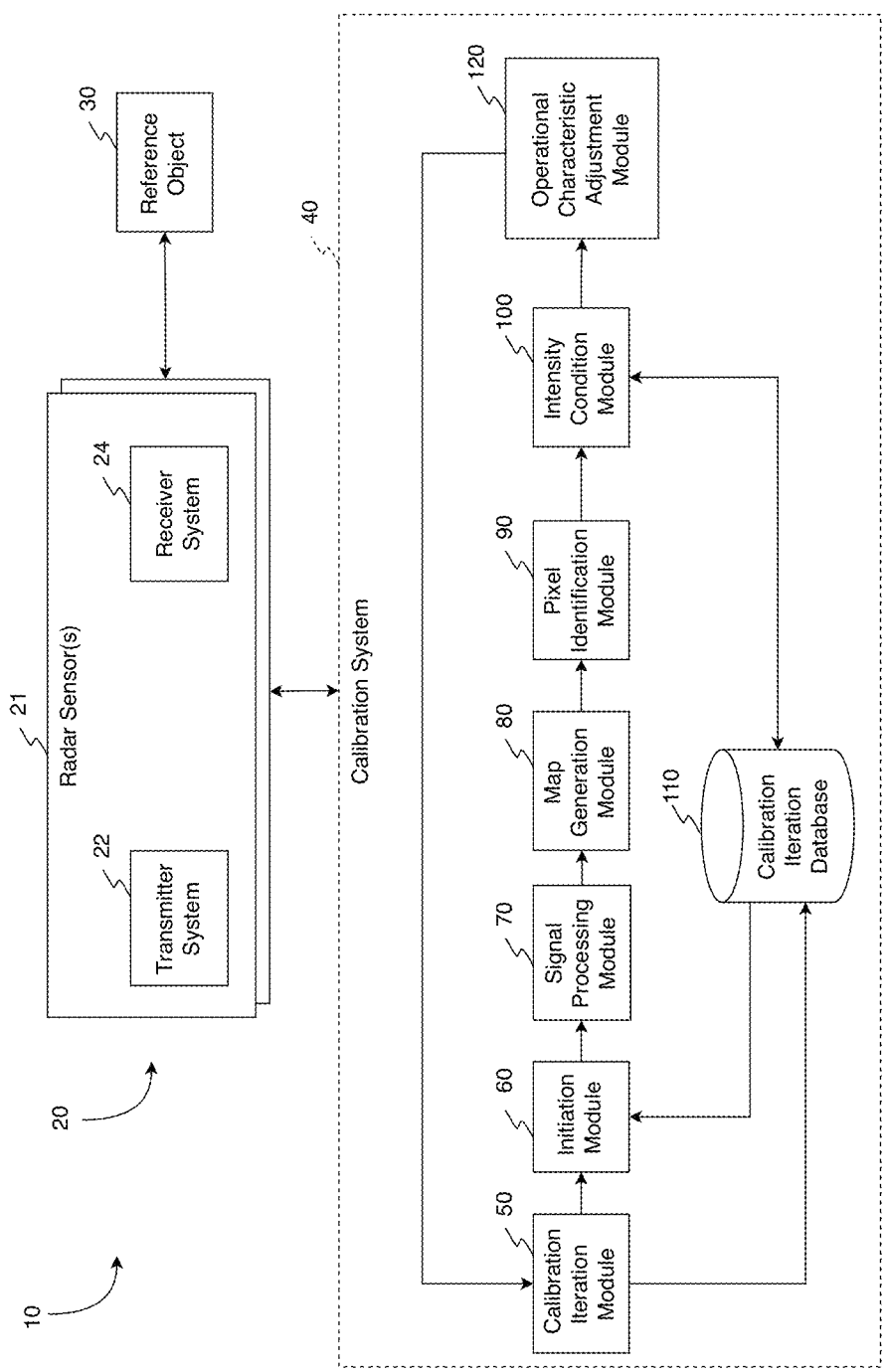
FIG. 1 is a functional block diagram of a calibration system for calibrating a radar system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for calibrating a radar system having one or more radar sensors, such as a frequency-modulated continuous wave (FMCW) radar. A calibration system defines one or more operational characteristics of the one or more radar sensors for a given calibration iteration and generates a range-azimuth map based on the resulting radar data generated by the one or more sensors during the calibration routine. The calibration system identifies a reference set of pixels from the range-azimuth map based on at least one of a computer vision routine, a random forest classifier routine, and a convolutional neural network routine to determine whether the set of intensity values of the range-azimuth map satisfy an intensity condition. The calibration system selectively adjusts the one or more operational characteristics of the one or more radar sensors based on the determination. As such, the calibration system described herein enables the radar system to accurately perform localization routines with improved accuracy when, for example, provided in a vehicle.

Referring to FIG. 1, a system 10 is provided and generally includes a radar system 20, a reference object 30, and a calibration system 40. It should be readily understood that any one of the components of the system 10 can be provided at the same location or distributed at different locations (e.g., via one or more edge computing devices) and communicably coupled accordingly. In one form, the components of the system 10 are communicably coupled using a wired or a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the radar system 20 includes one or more radar sensors 21 that detect contours and ranges of various objects of an environment surrounding the one or more radar sensors 21. As an example, when the one or more radar sensors 21 are provided in a vehicle, the one or more radar sensors 21 may detect traffic infrastructure, obstructions, pedestrians, other vehicles, among other objects. In one form, the one or more radar sensors 21 are FMCW radars that each include a transmitter system 22 and a receiver system 24. The transmitter system 22 is configured to continuously transmit millimeter waves with a modulated frequency, and the receiver system 24 is configured to continuously receive the reflected millimeter waves at the modulated frequency. As described below in further detail, the calibration system 40 is configured to generate radar data based on the transmitted and received millimeter waves and calibrate the one or more radar sensors 21 accordingly.

In one form, the calibration system 40 is configured to calibrate the one or more radar sensors 21 and includes a calibration iteration module 50, an initiation module 60, a signal processing module 70, a map generation module 80, a pixel identification module 90, an intensity condition module 100, a calibration iteration database 110, and an operational characteristic adjustment module 120. In one form, the calibration iteration module 50 defines and stores a plurality of calibration iteration entries in the calibration iteration database 110. As an example and as shown below in Table 1, each calibration iteration entry defines a calibration iteration value (e.g., iterations 1-10), one or more operational characteristics associated with each of the calibration iteration value ($OC_1$-$OC_{10}$), and the type/predetermined distance associated with the reference object 30 employed during the calibration. In one form, the reference object 30 may be provided by various types of reflective objects (e.g., a trihedral corner reflector, a stop sign, among other reflective objects).

TABLE 1

Calibration Iteration Entries of the
Calibration Iteration Database 110

| Calibration Iteration Entry | Operational Characteristics | Reference Object Type/ Predetermined Distance |
|---|---|---|
| 1 | $OC_1 = [f_1, \alpha_1, S_1, T_1, T_{Start\_1}, MP_1, T_{idle\_1}, T_{Ramp\_1}, AIV_1]$ | [Stop Sign, 20 meters] |
| 2 | $OC_2 = [f_2, \alpha_2, S_2, T_2, T_{Start\_2}, MP_2, T_{idle\_2}, T_{Ramp\_2}, AIV_2]$ | [Stop Sign, 20 meters] |
| 3 | $OC_3 = [f_3, \alpha_3, S_3, T_3, T_{Start\_3}, MP_3, T_{idle\_3}, T_{Ramp\_3}, AIV_3]$ | [Stop Sign, 20 meters] |
| 4 | $OC_4 = [f_4, \alpha_4, S_4, T_4, T_{Start\_4}, MP_4, T_{idle\_4}, T_{Ramp\_4}, AIV_4]$ | [Stop Sign, 20 meters] |
| 5 | $OC_5 = [f_5, \alpha_5, S_5, T_5, T_{Start\_5}, MP_5, T_{idle\_5}, T_{Ramp\_5}, AIV_5]$ | [Stop Sign, 20 meters] |
| 6 | $OC_6 = [f_6, \alpha_6, S_6, T_6, T_{Start\_6}, MP_6, T_{idle\_6}, T_{Ramp\_6}, AIV_6]$ | [Stop Sign, 20 meters] |
| 7 | $OC_7 = [f_7, \alpha_7, S_7, T_7, T_{Start\_7}, MP_7, T_{idle\_7}, T_{Ramp\_7}, AIV_7]$ | [Stop Sign, 20 meters] |
| 8 | $OC_8 = [f_8, \alpha_8, S_8, T_8, T_{Start\_8}, MP_8, T_{idle\_8}, T_{Ramp\_8}, AIV_8]$ | [Stop Sign, 20 meters] |
| 9 | $OC_9 = [f_9, \alpha_9, S_9, T_9, T_{Start\_9}, MP_9, T_{idle\_9}, T_{Ramp\_9}, AIV_9]$ | [Stop Sign, 20 meters] |
| 10 | $OC_{10} = [f_{10}, \alpha_{10}, S_{10}, T_{10}, T_{Start\_10}, MP_{10}, T_{idle\_10}, T_{Ramp\_10}, AIV_{10}]$ | [Stop Sign, 20 meters] |

In Table 1, f refers to a transmission frequency of the one or more radar sensors 21. As an example and referring to FIG. 2, which illustrates an example signal 200 transmitted by the one or more radar sensors 21 in accordance with the operational characteristics defined by one of the calibration entries, the transmission frequency f is based on the reciprocal of the difference between consecutive instances in which the transmitter system 22 is turned off (i.e., the reciprocal of $T_{Period}$, which is based on the difference between $T_{Tx\_Off\_1}$ and $T_{Tx\_Off\_2}$ in FIG. 2).

Additionally, in Table 1, T refers to a sampling period of the one or more radar sensors 21 (e.g., $T_S$ in FIG. 2), S refers to a sampling rate of the one or more radar sensors 21 during the sampling period T, $T_{Start}$ refers to a sampling start time of the one or more radar sensors 21, and a refers to a frequency slope of the one or more radar sensors 21. As used herein, "frequency slope" refers to a slope of the signal 200 during the sampling period, and different frequency scopes may correspond to different transmission ranges of the one or more radar sensors 21.

Figure 2:
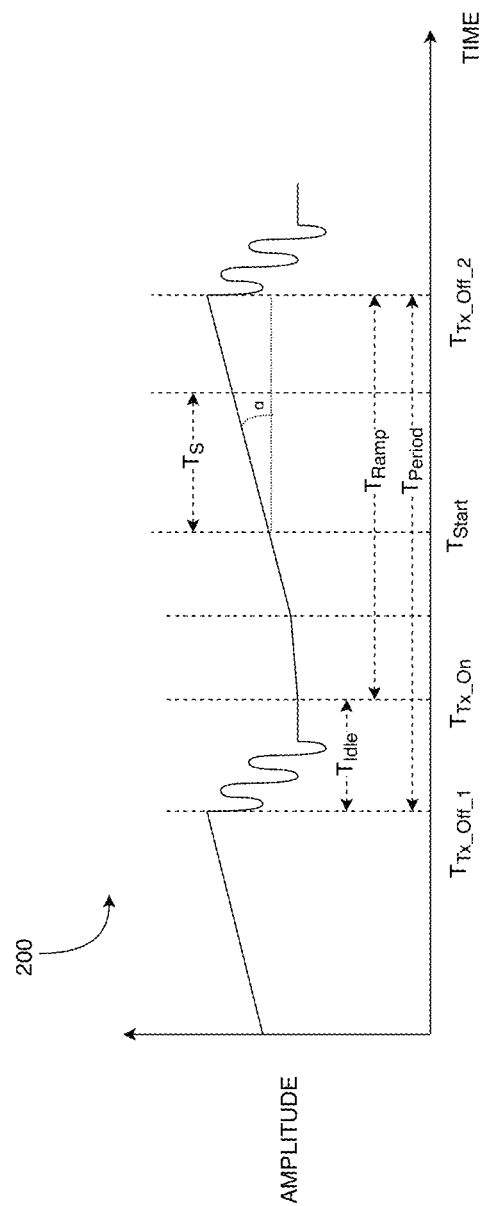
FIG. 2 illustrates an example signal transmitted by the one or more radar sensors in accordance with the teachings of the present disclosure.

Furthermore, in Table 1, $T_{Idle}$ refers to a time delay that occurs after turning off and prior to turning on the transmitter system 22 (e.g., $T_{Idle}$ in FIG. 2 is based on a difference between $T_{Tx\_Off\_1}$ and $T_{Tx\_On}$), and $T_{Ramp}$ refers to a ramping period between turning on and off the transmitter system 22 after the time delay and after the sampling period (e.g., $T_{Ramp}$ in FIG. 2 is based on a difference between $T_{Tx\_On}$ and $T_{Tx\_Off\_2}$). Additionally, in Table 1, MP refers to a modulation pattern of the signal transmitted by the one or more radar sensors 21 (e.g., a sinusoidal pattern, a rectangular pattern, a sawtooth pattern, a triangular pattern, a staircase pattern, among others).

In Table 1, AIV refers to an aggregate intensity value generated by the intensity condition module 100 and associated with the given operational characteristics of the calibration iteration. Additional details regarding the aggregate intensity value are provided below. While Table 1 illustrates the type/predetermined distance associated with the reference object 30 employed during the calibration as being a stop sign 20 meters away from the one or more radar sensors 21, it should be understood that additional calibration entries may be provided for other types and/or distances of the reference object 30.

In one form and referring to FIG. 1, the initiation module 60 is configured to initiate the calibration routine of the one or more radar sensors 21. As an example, the initiation module 60 selects one of the calibration iteration entries from the calibration iteration database 110 and selectively adjusts the operational characteristics of the one or more radar sensors 21 to match the selected calibration iteration entry. Additionally or alternatively, the initiation module 60 broadcasts a command to an operator or remote computing device to adjust the operational characteristics based on the calibration iteration entry via a controller, an augmented reality input device, a virtual reality input device, joystick, button, keyboard, mouse, a graphical user interface element of a touchscreen device, among other input devices. Additionally, the initiation module 60 broadcasts a command to the radar sensors 21 to transmit a signal and receive signals that are reflected by the reference object 30 (e.g., a stop sign or other traffic object) that is separated from the radar sensors 21 by a predetermined distance.

The signal processing module 70 is configured to generate radar data that is indicative of the displacement of the reference object (e.g., angle and/or distance) relative to the one or more radar sensors 21 based on the transmitted and received waves and the operational characteristics identified by the corresponding calibration iteration entry. In one form, the signal processing module 70 mixes the transmitted and received waves to generate an intermediate frequency (IF) signal and performs one or more fast Fourier transforms (FFTs) on the IF signal to generate a frequency domain IF signal. Subsequently, the signal processing module 70 identifies the beat frequencies of the frequency domain IF signal to generate one or more estimated distances of the reference object 30 relative to the one or more radar sensors 21 based on the frequency slope (as identified by the operational characteristics) and the speed of light. Moreover, the signal processing module 70 employs the beat frequencies of the frequency domain IF signal to generate one or more estimated angle of arrivals for each of the one or more radar sensors 21 and the corresponding angular displacements. While the signal processing module 70 is illustrated as part of calibration system 40, it should be understood that the signal processing module 70 may be positioned remotely from the calibration system 40 (e.g., the signal processing module 70 is provided as part of the one or more radar sensors 21).

Figure 3:
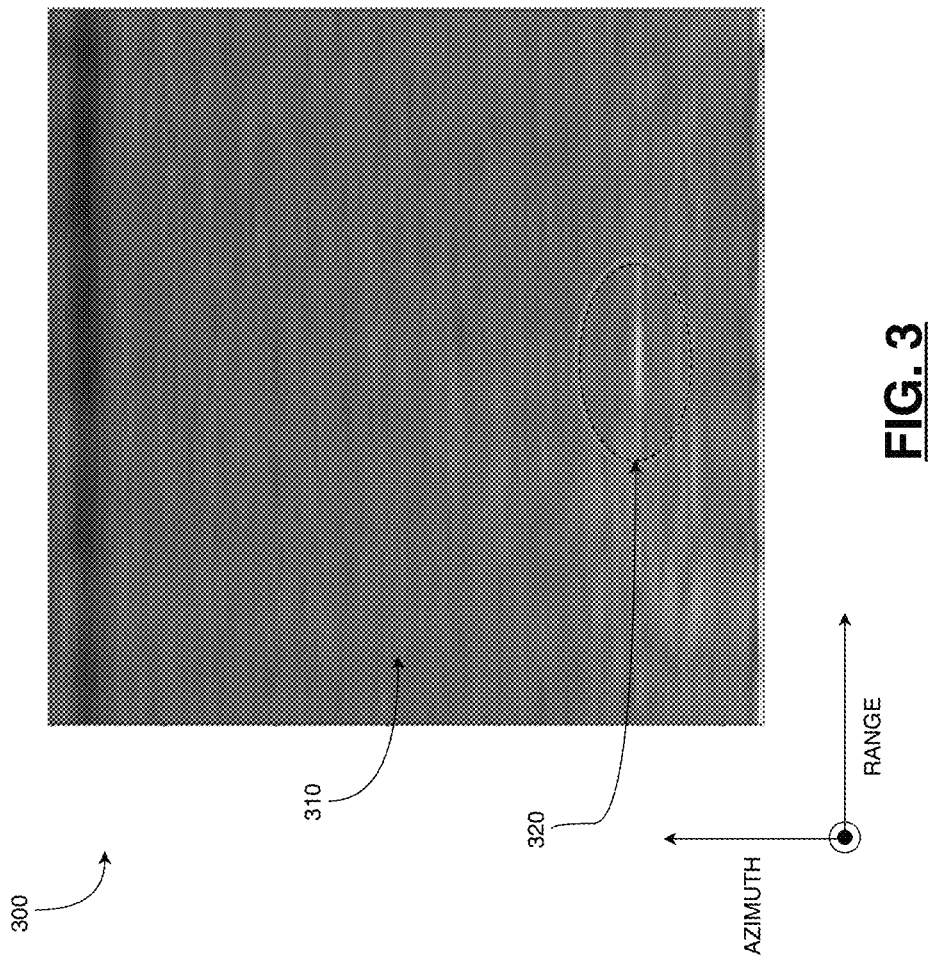
FIG. 3 illustrates an example range-azimuth map in accordance with the teachings of the present disclosure.

In one form and referring to FIGS. 1 and 3, the map generation module 80 generates a range-azimuth map 300 having a plurality of pixels 310 and associated intensity values based on the radar data generated by the signal processing module 70. As an example, the map generation module 80 generates the range-azimuth map 300 based on the one or more estimated distances and angular displacements generated by the signal processing module 70, and each pixel 310 of the range-azimuth map is associated with a given intensity value. In one form, higher intensity values may correspond to instances in which the given combination of a distance coordinate and angular displacement coordinate of the range-azimuth map 300 indicate a higher matching to the one or more estimated distances, the one or more estimated angular displacements, and a combination thereof. In one form, lower intensity values may correspond to instances in which the given combination of a distance coordinate and angular displacement coordinate of the range-azimuth map 300 indicate a low matching to the one or more estimated distances, the one or more estimated angular displacements, or a combination thereof.

The pixel identification module 90 is configured to identify a reference set of pixels from among the plurality of pixels 310. In one form, the reference set of pixels is associated with the reference object 30. As an example, the pixel identification module 90 identifies the reference set of pixels (e.g., pixels 320 in FIG. 3) by filtering the pixels 310 based on a threshold intensity value (e.g., the pixel identification module 90 identifies the pixels 320 as having an intensity value that is greater than a predefined threshold value).

In one form, the pixel identification module 90 identifies the reference set of pixels (e.g., pixels 320 in FIG. 3) by performing a convolutional neural network (CNN) routine. As an example, the pixel identification module 90 extracts one or more features based of the range-azimuth map 300 by, and the one or more features may be vectors that represent, for example, whether a given pixel 310 corresponds to the reference object 30. As such, the pixel identification module 90 may include one or more convolutional layers and one or more pooling layers that iteratively perform a convolution and pooling routine, respectively, to extract the one or more features. The convolutional layers may be defined by any suitable combination of parameters including, but not limited to: weights, kernel dimensions, number of kernels, stride values, padding values, input/output channels, bit depths, and rectified linear unit (ReLU) activation layers. Furthermore, the one or more pooling layers may be defined by any suitable combination of parameters including, but not limited to: the type of pooling routine (e.g., a maximum pooling routine, an average pooling routine, an L2-norm pooling routine, among others), kernel dimensions, and sliding values. While CNN routines are described herein, it should be understood that the pixel identification module 90 may perform other CNN routines and/or deep learning routines to perform the morphological operations and is not limited to the examples described herein. It should also be understood that known training routines may be employed to train the pixel identification module 90 to perform the CNN routines described herein.

In another form, the pixel identification module 90 identifies the reference set of pixels (e.g., the pixels 320 in FIG. 3) by performing a random forest classifier routine. As an example, the random forest classifier is an ensemble model that includes a plurality of classification nodes that employ binary rules to categorize the range-azimuth map 300. As an example, the binary rules may indicate whether the pixel 310 is greater than a threshold value, whether one or more adjacent pixels have an intensity value within a threshold intensity difference of the given pixel, whether the coordinates of the pixel are within a predetermined range, among other predictive binary rules. It should be understood that known training routines may be employed to train the pixel identification module 90 to perform the random forest classifier routine described herein.

In one form, the intensity condition module 100 determines whether the set of intensity values associated with the reference set of pixels 310A satisfy an intensity condition. As an example, the intensity condition module 100 sums each intensity value from among the set of intensity values to generate an aggregate intensity value. The intensity condition module 100 then determines whether the aggregate intensity value is greater than one or more additional aggregate intensity values for other calibration iteration entries associated with the same type of reference object 30 and the same predetermined distance of the reference object 30 and the one or more radar sensors 21. The intensity condition module 100 determines the intensity condition is satisfied in response to the aggregate intensity value being greater than the one or more additional aggregate intensity values. The intensity condition module 100 determines the intensity condition is not satisfied in response to the aggregate intensity value not being greater than each of the one or more additional aggregate intensity values.

In one form, the operational characteristic adjustment module 120 adjusts (or broadcasts a command to an operator or remote computing device to adjust) the operational characteristics of the one or more radar sensors 21 in response to the set of intensity values not satisfying the intensity condition. As an example, an operator may adjust, by way of a controller or other input device communicably coupled to the operational characteristic adjustment module 120, at least a set of the operational characteristics to enhance the accuracy and range of the one or more radar sensors 21. As another example, the operational characteristic adjustment module 120 may broadcast a command or notification indicating that the operational characteristics are not suitable for performing the localization routines and to adjust at least a set of the operational characteristics.

Figure 4:
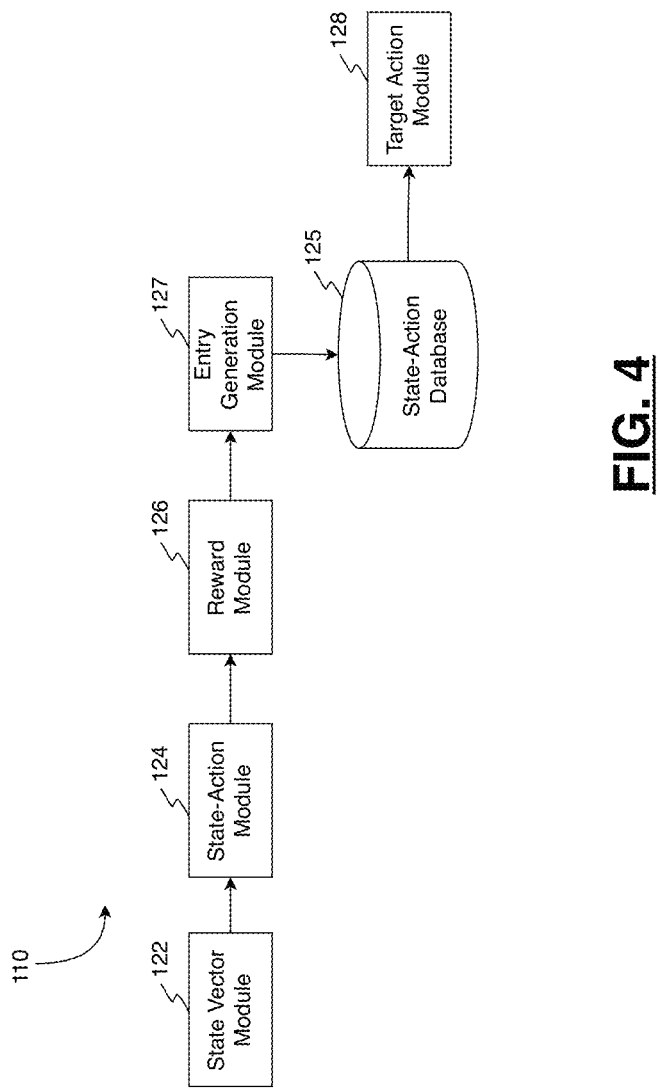
FIG. 4 illustrates an example operational characteristic adjustment module in accordance with the teachings of the present disclosure.

In one form and referring to FIGS. 1 and 4, the operational characteristic adjustment module 120 further includes a reinforcement learning network that includes a state vector module 122, a state-action module 124, a state-action database 125, a reward module 126, an entry generation module 127, and a target action module 128. As an example, when the calibration system 40 is performing the calibration routine described herein, the state vector module 122 generates a plurality of state vectors. In one form, each state vector indicates, for a given discrete time value (t in relation (1) below), the operational characteristic and the intensity values of the reference set of pixels 310A. The state vectors ($S^t$) may be represented based on the following relation:

$$S^t = (S_1^t, S_2^t, S_3^t, S_4^t) \quad (1)$$

In one form, the state-action module 124 defines a plurality of actions associated with the state vectors. The plurality of actions may include, but are not limited to: transmission frequency adjust action, a sampling period adjust action, a sampling rate adjustment action, a sampling start time adjustment action, a frequency slope adjustment action, a time delay adjustment action, a ramping period adjustment action, a modulation pattern adjustment action, and a state-remain action. As used herein, "state-remain action" refers to maintaining the current operational characteristics of the one or more radar sensors 21. In one form, the state-action module 124 defines an action for various data values of each action type.

In one form, the reward module 126 is configured to determine a reward for each action using known reinforcement learning routines (e.g., Q-learning routines having a learning rate equal to 0). The reward value is indicative of a qualitative and/or quantitative metric associated with the predicted resulting change of the operational characteristics of the one or more radar sensors 21. As an example, larger reward values may correspond to improved qualitative/quantitative metrics associated with the resulting operational characteristics, and smaller reward values may correspond to worsened qualitative/quantitative metrics associated with the resulting operational characteristics.

In one form, the entry generation module 127 associates each of the actions generated by the state-action module 124 and the corresponding reward value generated by the reward module 126 and generates an entry for each of the corresponding state-action-reward value. Furthermore, the entry generation module 127 stores the generated entries in the state-action database 125, and the target action module 128, when sufficiently trained, autonomously adjusts the one or more operational characteristics based on the entries of the state-action database 125.

Figure 5:
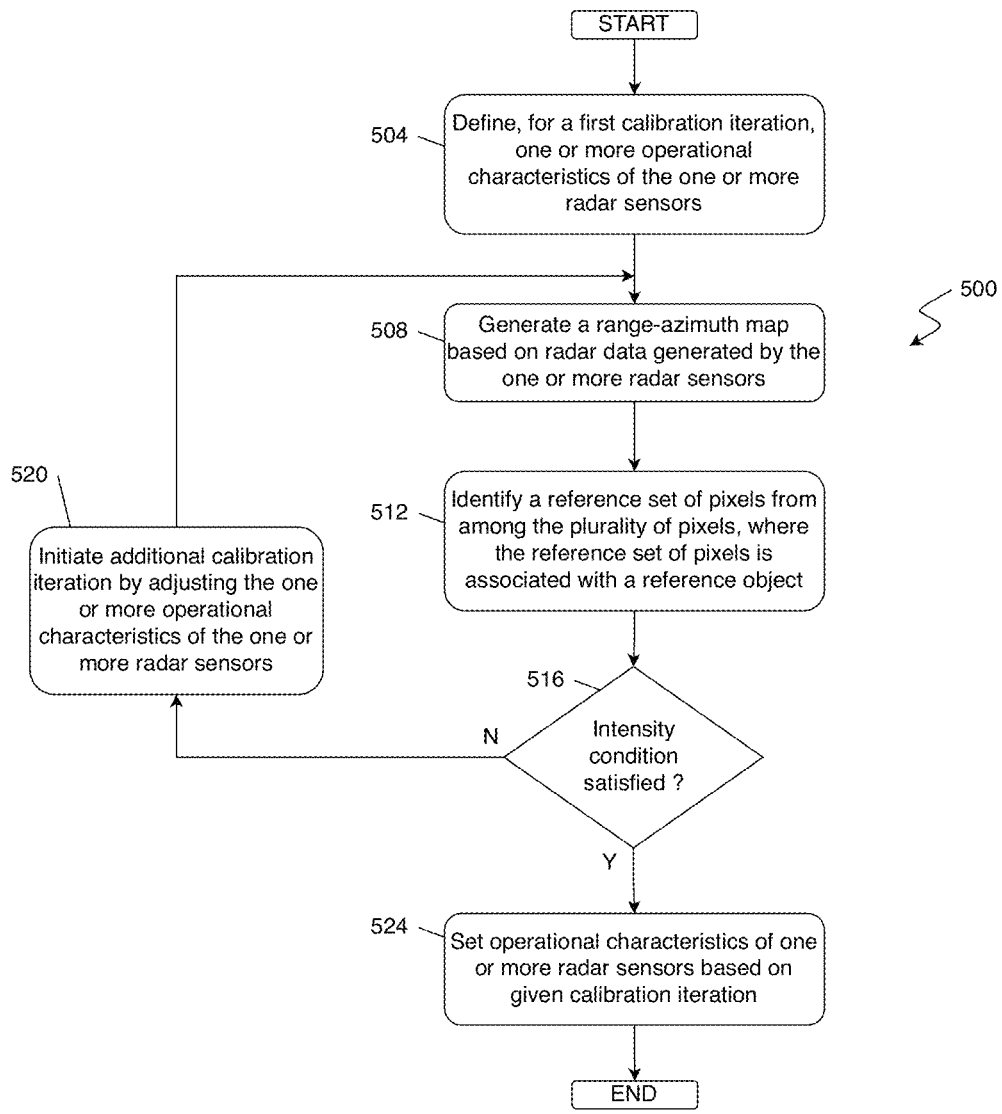
FIG. 5 is a flowchart of an example routine for calibrating a radar system in accordance with the teachings of the present disclosure.

Referring to FIG. 5, a flowchart illustrating a routine 500 for calibrating the radar system 20 is shown. At 504, the calibration system 40 defines, for a first calibration iteration from among a plurality of calibration iterations stored in the calibration iteration database 110, one or more operational characteristics of the one or more radar sensors 21. At 508, the calibration system 40 generates the range-azimuth map 300 based on the radar data generated by the one or more radar sensors 21. At 512, the calibration system 40 identifies a reference set of pixels from among the plurality of pixels 310 of the range-azimuth map 300. At 516, the calibration system 40 determines whether the set of intensity values associated with the reference set of pixels satisfies an intensity condition. If the intensity condition is not satisfied at 516, the routine 500 proceeds to 520, where the calibration system 40 initiates an additional calibration iteration by adjusting the one or more operational characteristics of the radar sensors 21 and then proceeds to 508. If the intensity condition is satisfied at 516, the routine 500 proceeds to 524, where the calibration system sets the operational characteristics of the one or more radar sensors 21 based on the given calibration iteration.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for calibrating a radar system comprising one or more radar sensors, the method comprising:
    defining, for a given calibration iteration from among a plurality of calibration iterations, one or more operational characteristics of the one or more radar sensors;
    generating a range-azimuth map based on radar data generated by the one or more radar sensors, wherein:
        the radar data is based on the one or more operational characteristics;
        the range-azimuth map comprises a plurality of pixels and a plurality of intensity values; and
        each pixel from among the plurality of pixels is associated with one intensity value from among the plurality of intensity values;
    identifying a reference set of pixels from among the plurality of pixels, wherein the reference set of pixels is associated with a reference object;
    determining whether a set of intensity values associated with the reference set of pixels satisfies an intensity condition; and
    adjusting the one or more operational characteristics of the one or more radar sensors in response to the set of intensity values not satisfying the intensity condition.

2. The method of claim 1, wherein the one or more radar sensors include a frequency-modulated continuous wave (FMCW) radar.

3. The method of claim 1, wherein the one or more operational characteristics include a transmission frequency, a frequency slope, a sampling rate, a modulation pattern, a sampling period, a sampling start time, or a combination thereof.

4. The method of claim 1, wherein the reference object and the one or more radar sensors are separated by a predetermined distance.

5. The method of claim 1, wherein generating the range-azimuth map further comprises converting the radar data into one or more estimated distances and one or more estimated angular displacements based on a Fast Fourier Transform (FFT) routine.

6. The method of claim 1 further comprising:
    summing each intensity value from among the set of intensity values to generate an aggregate intensity value;
    determining whether the aggregate intensity value is greater than one or more additional aggregate intensity values associated with one or more additional calibration iterations from among the plurality of calibration iterations; and determining the set of intensity values associated with the reference set of pixels satisfies the intensity condition in response to the aggregate intensity value being greater than the one or more additional aggregate intensity values.

7. The method of claim 6 further comprising determining the set of intensity values associated with the reference set of pixels does not satisfy the intensity condition in response to the aggregate intensity value being less than the one or more additional aggregate intensity values.

8. The method of claim 1, wherein identifying the reference set of pixels from among the plurality of pixels further comprises performing a random forest classifier routine to identify the reference set of pixels.

9. The method of claim 1, wherein identifying the reference set of pixels from among the plurality of pixels further comprises performing a convolutional neural network routine to identify the reference set of pixels.

10. A system for calibrating a radar system comprising one or more radar sensors and using a reference object, the system comprising:
one or more processors and one or more nontransitory computer-readable mediums storing instructions that are executable by the one or more processors, wherein the instructions comprise:
defining, for a given calibration iteration from among a plurality of calibration iterations, one or more operational characteristics of the one or more radar sensors;
generating a range-azimuth map associated based on radar data generated by the one or more radar sensors, wherein the range-azimuth map comprises a plurality of pixels and a plurality of intensity values, and wherein each pixel from among the plurality of pixels is associated with one intensity value from among the plurality of intensity values;
identifying, using one of a random forest classifier and a convolutional neural network, a reference set of pixels from among the plurality of pixels, wherein the reference set of pixels is associated with the reference object;
determining whether a set of intensity values associated with the reference set of pixels satisfies an intensity condition; and
adjusting the one or more operational characteristics of the one or more radar sensors in response to the set of intensity values not satisfying the intensity condition.

11. The system of claim 10, wherein the one or more radar sensors include a frequency-modulated continuous wave (FMCW) radar.

12. The system of claim 10, wherein the one or more operational characteristics include a transmission frequency, a frequency slope, a sampling rate, a modulation pattern, a sampling period, a sampling start time, or a combination thereof.

13. The system of claim 10, wherein the reference object and the one or more radar sensors are separated by a predetermined distance.

14. The system of claim 10, wherein the instructions for generating the range-azimuth map further comprises converting the radar data into one or more estimated distances and one or more estimated angular displacements based on a Fast Fourier Transform (FFT) routine.

15. The system of claim 10, wherein the instructions further comprise:

summing each intensity value from among the set of intensity values to generate an aggregate intensity value;
determining whether the aggregate intensity value is greater than one or more additional aggregate intensity values associated with one or more additional calibration iterations from among the plurality of calibration iterations; and
determining the set of intensity values associated with the reference set of pixels satisfies the intensity condition in response to the aggregate intensity value being greater than the one or more additional aggregate intensity values.

16. The system of claim 15, wherein the instructions further comprise determining the set of intensity values associated with the reference set of pixels does not satisfy the intensity condition in response to the aggregate intensity value being less than the one or more additional aggregate intensity values.

17. A method for calibrating a radar system comprising one or more radar sensors and using a reference object, the method comprising:
defining, for a given calibration iteration from among a plurality of calibration iterations, one or more operational characteristics of the one or more radar sensors, wherein the one or more radar sensors include a frequency-modulated continuous wave (FMCW) radar;
generating a range-azimuth map associated based on radar data generated by the one or more radar sensors, wherein the range-azimuth map comprises a plurality of pixels and a plurality of intensity values, and wherein each pixel from among the plurality of pixels is associated with one intensity value from among the plurality of intensity values;
identifying, using one of a random forest classifier and a convolutional neural network, a reference set of pixels from among the plurality of pixels, wherein the reference set of pixels is associated with the reference object;
determining whether a set of intensity values associated with the reference set of pixels satisfies an intensity condition; and
adjusting the one or more operational characteristics of the one or more radar sensors in response to the set of intensity values not satisfying the intensity condition.

18. The method of claim 17 further comprising:
summing each intensity value from among the set of intensity values to generate an aggregate intensity value;
determining whether the aggregate intensity value is greater than one or more additional aggregate intensity values associated with one or more additional calibration iterations from among the plurality of calibration iterations; and
determining the set of intensity values associated with the reference set of pixels satisfies the intensity condition in response to the aggregate intensity value being greater than the one or more additional aggregate intensity values.

19. The method of claim 18 further comprising determining the set of intensity values associated with the reference set of pixels does not satisfy the intensity condition in response to the aggregate intensity value being less than the one or more additional aggregate intensity values.

20. The method of claim 17, wherein the one or more operational characteristics include a transmission frequency, a frequency slope, a sampling rate, a modulation pattern, a sampling period, a sampling start time, or a combination thereof.

* * * * *